US011956872B1

(12) United States Patent
Park

(10) Patent No.: US 11,956,872 B1
(45) Date of Patent: Apr. 9, 2024

(54) DISPLAY DEVICE FOR ALLEVIATING FLICKER PHENOMENON AND PULSE MODULATOR INCLUDED IN THE SAME

(71) Applicant: TLI Inc., Seongnam-si (KR)

(72) Inventor: Ju Hyun Park, Suwon-si (KR)

(73) Assignee: TLI INC., Seongnam-si (KR)

( * ) Notice: Subject to any disclaimer, the term of this patent is extended or adjusted under 35 U.S.C. 154(b) by 0 days.

(21) Appl. No.: 18/315,293

(22) Filed: May 10, 2023

(30) Foreign Application Priority Data

Sep. 20, 2022 (KR) ........................ 10-2022-0118240

(51) Int. Cl.

| | |
|---|---|
| ***G09G 3/32*** | (2016.01) |
| ***G09G 3/20*** | (2006.01) |
| ***H05B 45/325*** | (2020.01) |
| ***H05B 45/59*** | (2022.01) |

(52) U.S. Cl.
CPC ........... *H05B 45/59* (2022.01); *G09G 3/2025* (2013.01); *G09G 3/32* (2013.01); *H05B 45/325* (2020.01); *G09G 2320/0247* (2013.01)

(58) Field of Classification Search
CPC ........................... G09G 3/2014; G09G 3/2018
See application file for complete search history.

(56) References Cited

U.S. PATENT DOCUMENTS

| | | | | |
|---|---|---|---|---|
| 8,941,558 B2 | 1/2015 | Park et al. | |
| 10,964,262 B1 * | 3/2021 | Lin | G09G 3/2022 |
| 2016/0275845 A1 * | 9/2016 | Tsai | G09G 3/2003 |
| 2018/0075801 A1 * | 3/2018 | Le | G09G 3/3233 |
| 2022/0415245 A1 | 12/2022 | Lee et al. | |

FOREIGN PATENT DOCUMENTS

| | | |
|---|---|---|
| KR | 10-0850498 | 8/2008 |
| KR | 10-2199942 | 1/2021 |

* cited by examiner

*Primary Examiner* — Kevin M Nguyen
(74) *Attorney, Agent, or Firm* — KILE PARK REED & HOUTTEMAN PLLC

(57) ABSTRACT

In a display device according to an embodiment, subframes having the same number of active unit time(s) are distributed. As a result, according to the display device of the disclosure, the flicker phenomenon may be alleviated.

15 Claims, 3 Drawing Sheets

DISPLAY DEVICE FOR ALLEVIATING FLICKER PHENOMENON AND PULSE MODULATOR INCLUDED IN THE SAME

CROSS-REFERENCE TO RELATED APPLICATION

This application claims priority to and the benefit of Korean Patent Application No. 2022-0118240 under 35 U.S.C. § 119, filed in the Korean Intellectual Property Office (KIPO) on Sep. 20, 2022, the disclosure of which is incorporated herein by reference in its entirety.

BACKGROUND

1. Technical Field

The disclosure relates to a display device, and more specifically, to a display device for alleviating flicker phenomenon and a pulse modulator included in the same.

2. Discussion of Related Art

Display devices such as LED displays may include light emitting elements such as LEDs. The light emitting element may emit light with brightness according to the data value of the corresponding display data. Brightness may correspond to luminous energy, which is the energy of light, and is a function of luminous intensity and luminous time.

As a brightness control method of a display device, a so-called ‘pulse width modulation (PWM) driving method’ is widely used. In the PWM driving method, one unit frame is divided into subframes. Each of the subframes includes unit times. The number of unit times, in which the modulation signal is activated, may be adjusted according to the data value of the display data.

According to the PWM driving method, the data value of the display data of the light emitting element may be modulated as the sum of the activation widths of the modulation signal. The light emitting element may emit light with maintaining a constant luminous intensity during the activation of the modulation signal.

However, in case that the display data of the light emitting device has a special data value, there may be a subframe having the number ‘a’ of activation unit times and a subframe having the number ‘(a+1)’ of activation unit times. Here, ‘a’ is an integer greater than or equal to ‘0’. In this specification, the term of ‘active unit time’ means the unit time in which the modulation signal is activated.

If subframes having the number ‘a’ of active unit times proceed continuously and subframes having the number ‘(a+1)’ of active unit times proceed continuously, a flicker phenomenon may occur in the displayed image.

Therefore, in order for a display device to provide a high quality image, it is important to alleviate a flicker phenomenon by distributing subframes having the same number of active unit time.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

The disclosure is directed to a display device for alleviating flicker phenomenon with distributing subframes having same number of active unit time and a pulse modulator included in the same.

The technical objectives to be achieved by the disclosure are not limited to those described herein, and other technical objectives that are not mentioned herein would be clearly understood by a person skilled in the art from the description of the disclosure.

According to an aspect of the disclosure, there is provided a display device.

The display device according to the disclosure may comprise a display panel including a light emitting element, wherein the light emitting element emits light with brightness according to a total amount of current flowing in the light emitting element during a unit frame; a data driver that allows current to flow through the light emitting element of the display panel for a time corresponding to an activation width of a modulation signal; and a pulse width modulator that generates the modulation signal with modulating display data of the light emitting element of the display panel during the unit frame, wherein the activation width of the modulation signal corresponds to a data value of the display data. The unit frame includes 1-st to n-th subframes which are sequentially progressed, and each of the 1-st to n-th subframes is a number ‘p’ of unit times, each of the unit times corresponds to a corresponding unit data value of the display data. The activation width of the modulation signal in the i-th subframe is associated with whether an integer value of an estimated cumulative error of the i-th subframe is equal to the integer value of the estimated cumulative error of the (i−1)-th subframe, and the estimated cumulative error of the i-th subframe is defined by $\{(i*r+e)/n\}$. Here, ‘n’ is a natural number greater than or equal to ‘4’, ‘p’ is a natural number greater than or equal to ‘2’, ‘i’ is a natural number between ‘1‘ and’n’, ‘r’ is a remainder obtained by dividing the data value of the display data by ‘n’, ‘r’ is an integer between ‘0‘ and’(n−1)’, and ‘e’ is an arbitrary number.

The integer value of the estimated cumulative error of a 0-th subframe may be ‘0’.

The activation width of the modulation signal in the i-th subframe may correspond to a length of a number ‘a’ of the unit times in case that the integer value of the estimated cumulative error of the i-th subframe is equal to the integer value of the estimated cumulative error of the (i−1)-th subframe, and ‘a’ may be a quotient obtained by dividing the data value of the display data by ‘n’.

The activation width of the modulation signal in the i-th subframe may correspond to the length of a number ‘a+1’ of the unit times in case that the integer value of the estimated cumulative error of the i-th subframe is different from the integer value of the estimated cumulative error of the (i−1)-th subframe.

Here, ‘e’ may be ‘0’, or ‘e’ may be ‘n−1’.

The integer values of the 1st and 2nd subframes may be ‘0’, the integer values of the 3rd to 5th subframes may be ‘1’, the integer values of the 6th to 7th subframes may be ‘2’, and the integer value of the 8th subframe may be ‘3’.

The pulse width modulator may transmit the modulation signal to a switch of the data driver, and the switch of the data driver may be activated based on the modulation signal.

According to other aspect of the disclosure, there is provided a pulse width modulator.

The pulse width modulator according to the disclosure may comprise a data storing part that stores display data; and a pulse width modulating part that receives the display data provided from the data storing part, and generates a modulation signal with modulating the display data during a unit frame, wherein an activation width of the modulation signal correspond to a data value of the display data. The unit frame includes 1-st to n-th subframes which are sequentially progressed, and each of the 1-st to n-th subframes is a number 'p' of unit times, and each of the unit times corresponds to a corresponding unit data value of the display data. The activation width of the modulation signal in the i-th subframe is associated with whether an integer value of the estimated cumulative error of the i-th subframe is equal to the integer value of the estimated cumulative error of the (i−1)-th subframe, and the estimated cumulative error of the i-th subframe is defined by {(i*r+e)/n}. Here, 'n' is a natural number greater than or equal to '4', 'p' is a natural number greater than or equal to '2', 'i' is a natural number between '1' and'n', 'r' is a remainder obtained by dividing the data value of the display data by 'n', 'r' is an integer between '0' and '(n−1)', and 'e' is an arbitrary number.

The integer value of the estimated cumulative error of a 0-th subframe may be '0'.

The activation width of the modulation signal in the i-th subframe may correspond to a length of a number 'a' of the unit times in case that the integer value of the estimated cumulative error of the i-th subframe is equal to the integer value of the estimated cumulative error of the (i−1)-th subframe, and 'a' may be a quotient obtained by dividing the data value of the display data by 'n'.

The activation width of the modulation signal in the i-th subframe may correspond to the length of 'a+1' number of the unit times in case that the integer value of the estimated cumulative error of the i-th subframe is different from the integer value of the estimated cumulative error of the (i−1)-th subframe.

Here, 'e' may be '0', or 'e' may be 'n−1'.

The integer values of the 1st and 2nd subframes may be '0', the integer values of the 3rd to 5th subframes may be '1', the integer values of the 6th to 7th subframes may be '2', and the integer value of the 8th subframe may be '3'.

In the display device of the disclosure configured as described above, subframes having the same number of active unit time are distributed. As a result, according to the display device of the disclosure, the flicker phenomenon is alleviated.

BRIEF DESCRIPTION OF THE DRAWINGS

The above and other objects, features and advantages of the disclosure will become more apparent to those skilled in the art by describing in detail embodiments thereof with reference to the accompanying drawings, in which.

DETAILED DESCRIPTION OF THE EMBODIMENTS

Figure 1:
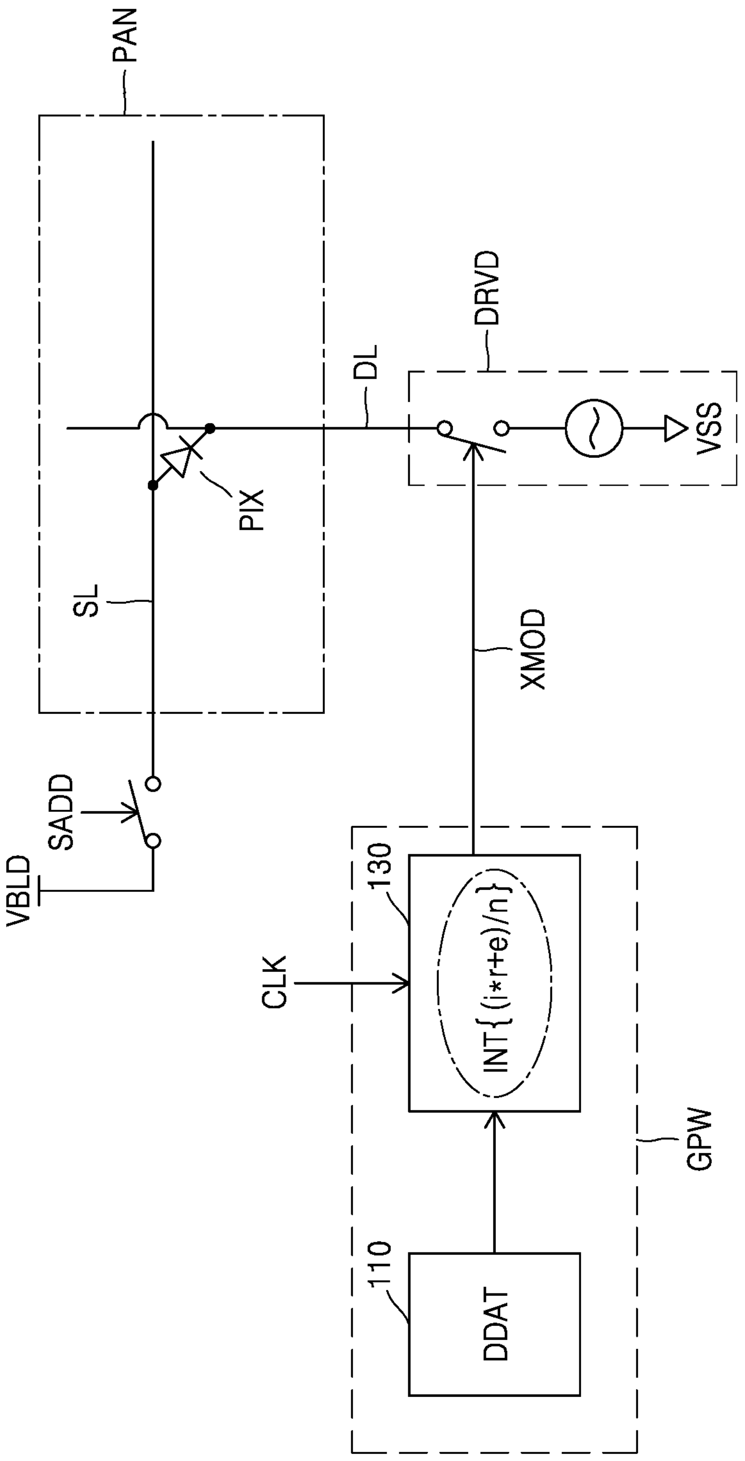
FIG. 1 is a schematic drawing illustrating the display device according to an embodiment of the disclosure.

Embodiments of the disclosure will be described in detail below with reference to the accompanying drawings. While the disclosure is shown and described in connection with embodiments thereof, it will be apparent to those skilled in the art that various modifications can be made without departing from the spirit and scope of the disclosure. Thus, the scope of the disclosure is not limited to these embodiments.

The terminology used herein is for the purpose of describing particular embodiments only and is not intended to be limiting of the disclosure. As used herein, the singular forms, such as "a" and "an," are intended to include the plural forms as well, unless the context clearly indicates otherwise. It will be further understood that the terms "comprises," "includes," "has," and/or their variants when used in this specification, specify the presence of stated features, regions, integers, steps, operations, elements, and/or components, but do not preclude the presence or addition of one or more other features, regions, integers, steps, operations, elements, components, and/or groups thereof.

As customary in the field, some embodiments are described and illustrated in the accompanying drawings in terms of functional blocks, units, parts, and/or modules. Those skilled in the art will appreciate that these blocks, units, parts, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, parts, and/or modules being implemented by microprocessors or other similar hardware, they may be programmed and controlled using software (e.g., microcode) to perform various functions discussed herein and may optionally be driven by firmware and/or software. It is also contemplated that each block, unit, part, and/or module may be implemented by dedicated hardware, or as a combination of dedicated hardware to perform some functions and a processor (e.g., one or more programmed microprocessors and associated circuitry) to perform other functions. Also, each block, unit, part, and/or module of some embodiments may be physically separated into two or more interacting and discrete blocks, units, parts, and/or modules without departing from the scope of the disclosure. Further, the blocks, units, parts, and/or modules of some embodiments may be physically combined into more complex blocks, units, parts, and/or modules without departing from the scope of the disclosure.

The term "and/or" includes all combinations of one or more of which associated configurations may define. For example, "A and/or B" may be understood to mean "A, B, or A and B."

For the purposes of this disclosure, the phrase "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Hereinafter, embodiment of the disclosure will be described in detail with reference to the accompanying drawings.

FIG. 1 is a schematic drawing illustrating the display device according to an embodiment of the disclosure. Referring to FIG. 1, the display device of the disclosure may comprise a display panel PAN, a data driver DRVD and a pulse width modulator GPW.

In the display panel PAN, a light emitting element PIX may be included. Of course, the display panel PAN may include multiple light emitting elements PIX specified by a corresponding scan line SL and a corresponding data line DL. However, in FIG. 1, one light emitting element PIX, which may be implemented as, for example, an LED, is illustrated as an example for simplicity of description.

The light emitting element PIX may emit light with brightness according to the total amount of current flowing therein during a unit frame UFR. See, e.g., FIG. 2 and FIG. 3.

Here, the unit frame UFR may mean a time period in which a light emitting element PIX emits light with brightness according to the data value of the corresponding display data DDAT to display a unit image.

The data driver DRVD may be driven to allow current to flow through the light emitting element PIX of the display panel PAN for the time corresponding to the "H" activation width of a modulation signal XMOD.

For example, the scan line SL corresponding to the scan address SADD may be activated to the emission voltage VBLD, and the corresponding data line DL may be controlled to have the ground voltage VSS by the activation of the modulation signal XMOD. Current may flow through the light emitting element PIX. In case that the intensity of the current, for example, the luminous intensity, is constant, the brightness of the light emitting device PIX may correspond to the sum of the activation times of the modulation signals XMOD, for example, the sum of the light emission times.

The pulse width modulator GPW may be driven to generate the modulation signal XMOD with modulating a display data DDAT of the light emitting element of the display panel PAN during the unit frame UFR. The activation width of the modulation signal XMOD may correspond to the data value of the display data DDAT.

The pulse width modulator GPW may include a data storing part 110 and a pulse width modulating part 130.

The data storing part 110 may store the display data DDAT of the light emitting element PIX. The display data DDAT may be provided from an external system or generated internally in the display device.

The pulse width modulating part 130 may be driven to receive the display data DDAT provided from the data storing part 110. The pulse width modulating part 130 may be driven to generate the modulation signal XMOD with modulating the display data DDAT in synchronization with the clock signal CLK during the unit frame UFR. The activation width of the modulation signal XMOD may correspond to the data value of the display data DDAT.

The unit frame UFR may include or be composed of the number 'n' of subframes SFR which are sequentially progressed. Here, 'n' may be a natural number greater than or equal to '4', and may be '8' in this embodiment. For example, 1-st to 8-th subframes SFR<1:8> may be sequentially progressed.

Each of the 1-st to 8-th subframes SFR<1:8> may be the number 'p' of unit times UT. See, e.g., FIG. 2 and FIG. 3. Here, 'p' may be a natural number greater than or equal to '2', and may be '4' in this embodiment.

The unit time UT may correspond to the unit data value of the display data DDAT, and may be set based, e.g., on 1 cycle, ½ cycle, 2 cycles, etc. of the clock signal CLK.

Subsequently, the number of unit time(s) UT of each subframe SFR, in which the modulation signal XMOD is activated, is examined.

In this embodiment, the relationship between the data value (G) of the display data DDAT and the number of subframe(s) SFR, for example, 'n', may be as shown in Equation 1.

$$G=(a*n)+r \qquad \text{(Equation 1)}$$

Here, the 'a' is a quotient obtained by dividing the data value (G) of the display data by the 'n'. The 'r' is a remainder obtained by dividing the data value (G) of the display data DDAT by the 'n'.

The activation width of the modulation signal XMOD in the i-th subframe SFR<i> may depend on or may be associated with whether the integer value of the estimated cumulative error of the i-th subframe SFR<i> is equal to the integer value of the estimated cumulative error of the (i−1)-th subframe SFR<i−1>. Here, 'i' is a natural number between '1' and 'n'.

The estimated cumulative error ACR<i> of the i-th subframe SFR<i> may be defined by (Equation 2).

$$ACR<i>=(i*r+e)/n \qquad \text{(Equation 2)}$$

Here, the 'e' may be an arbitrary number.

For example, 'e' may be a number for determining the position of the subframe SFR having a relatively large activation width of the modulation signal XMOD, and may be referred to as 'position determination number' in this specification.

The 0-th subframe may be a virtual frame, and the integer value of the estimated cumulative error of the 0-th subframe may be estimated as '0'.

For example, the activation width of the modulation signal XMOD in the i-th subframe SFR<i> may be as follows.

First, in case that the integer value INT<i> of the estimated cumulative error ACR<i> of the i-th subframe SFR<i> is equal to the integer value INT<i−1> of the estimated cumulative error ACR<i−1> of the (i−1)-th subframe SFR<i−1>, the activation width of the modulation signal XMOD in the i-th subframe SFR<i> may correspond to the length of the number 'a' of the unit times UT.

In case that the integer value INT<i> of the estimated cumulative error ACR<i> of the i-th subframe SFR<i> is different from the integer value INT<i−1> of the estimated cumulative error ACR<i−1> of the (i−1)-th subframe SFR<i−1>, the activation width of the modulation signal XMOD in the i-th subframe SFR<i> may correspond to the length of the number 'a+1' of the unit times UT.

Subsequently, the modulation of the data value of the display data DDAT to the activation width of the modulation signal XMOD will be described in detail, with reference to FIG. 2 and FIG. 3.

In this embodiment, n may be '8' as described above. For example, as shown in FIG. 2 and FIG. 3, the unit frame UFR may include or may be composed of the 1-st to 8-th subframes SFR<1:8> that proceed in sequence.

Also, p may be '4' as described above. For example, each of the 1-st to 8-th subframes SFR<1:8> may be the number '4' of unit time UT.

Accordingly, in this embodiment, the number '1' of unit frame UFR has the number '32' of unit time UT. The unit time UT may correspond to the unit data value of the display data DDAT. In this embodiment, the unit data value of the display data DDAT may be '1'.

As a result, the depth of the display data DDAT may be '32' from 1 to 32. Here, the depth of the display data DDAT may mean the number of data values that may be represented by the display data DDAT.

In this embodiment, the data value (G) of the display data DDAT may be '11'. In case that the data value (G) of the display data DDAT may be divided by the number (n) of the subframe SFR, the quotient (a) may be ‘1’ and the remainder (r) may be ‘3’.

The estimated cumulative errors ACR in the 1-st to 8-th subframes SFR<1:8> may be shown in (Table 1) and (Table 2).

(Table 1) shows the case where the position determination number (e) is ‘0’.

TABLE 1

| | SRF <1> | SRF <2> | SRF <3> | SRF <4> | SRF <5> | SRF <6> | SRF <7> | SRF <8> |
|---|---|---|---|---|---|---|---|---|
| (i*r + e) | 3 | 6 | 9 | 12 | 15 | 18 | 21 | 24 |
| ACR<i> = {(i*r + e)/n} | 0.375 | 0.750 | 1.125 | 1.500 | 1.875 | 2.250 | 2.625 | 3.000 |
| INT<i> = integer value of {(i*r + e)/n} | 0 | 0 | 1 | 1 | 1 | 2 | 2 | 3 |

In the case of (Table 1), the subframes in which the integer value INT of the estimated cumulative error ACR of the present subframe SFR is equal to the integer value INT of the estimated cumulative error ACR of the previous subframe SFR, are the 1-st subframe SFR<1>, the 2-nd subframe SFR<2>, the 4-th subframe SFR<4>, the 5-th subframe SFR<5>, and the 7-th subframe SFR<7>.

The subframes in which the integer value INT of the estimated cumulative error ACR of the present subframe SFR is different from the integer value INT of the estimated cumulative error ACR of the previous subframe SFR, are the 3-rd subframe SFR<3>, the 6-th subframe SFR<6> and the 8-th subframe SFR<8>.

Figure 2:
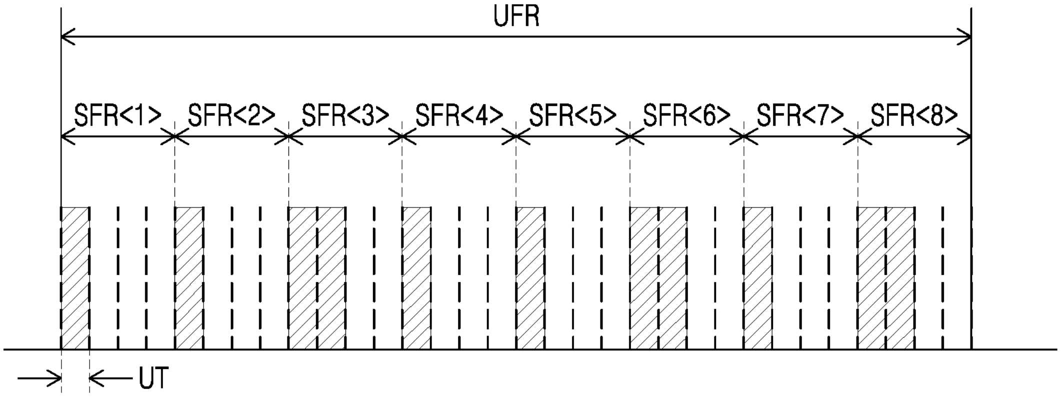
FIG. 2 and FIG. 3 are schematic drawings illustrating that subframes having the same number of active unit times are distributed, in the display device of FIG. 1.

In the case of (Table 1), the activation width of the modulation signal XMOD in each subframe SFR is as shown in FIG. 2.

In other words, in each of the 1-st subframe SFR<1>, the 2-nd subframe SFR<2>, the 4-th subframe SFR<4>, the 5-th subframe SFR<5>, and the 7-th subframe SFR<7>, the activation width of the modulation signal XMOD corresponds to the number ‘a’ of unit time UT, for example, the number ‘1’ of unit time UT.

In each of the 3-rd subframe SFR<3>, the 6-th subframe SFR<6> and the 8-th subframe SFR<8>, the activation width of the modulation signal XMOD corresponds to the number ‘a+1’ of unit time UT, for example, the number ‘2’ of unit time UT.

As a result, in the case of (Table 1), the subframes SFR in which the modulation signal XMOD is activated, for example, the subframes SFR in which the number of active unit time(s) is ‘(a+1)’, may not be continuous. Here, the ‘active unit time’ may mean the unit time UT in which the modulation signal XMOD is activated.

(Table 2) shows the case where the position determination number (e) is ‘7’, which is (n−1).

TABLE 2

| | SRF <1> | SRF <2> | SRF <3> | SRF <4> | SRF <5> | SRF <6> | SRF <7> | SRF <8> |
|---|---|---|---|---|---|---|---|---|
| (i*r + e) | 10 | 13 | 16 | 19 | 22 | 25 | 28 | 31 |
| ACR<i> = {(i*r + e)/n} | 1.250 | 1.625 | 2.000 | 2.375 | 2.750 | 3.125 | 3.500 | 3.875 |
| INT<i> = integer value of {(i*r + e)/n} | 1 | 1 | 2 | 2 | 2 | 3 | 3 | 3 |

In the case of (Table 2), the subframes in which the integer value INT of the estimated cumulative error ACR of the present subframe SFR is equal to the integer value INT of the estimated cumulative error ACR of the previous subframe SFR are the 2-nd subframe SFR<2>, the 4-th subframe SFR<4>, the 5-th subframe SFR<5>, the 7-th subframe SFR<7> and the 8-th subframe SFR<8>.

The subframes in which the integer value INT of the estimated cumulative error ACR of the present subframe SFR is different from the integer value INT of the estimated cumulative error ACR of the previous subframe SFR, are the 1-st subframe SFR<1>, the 3-rd subframe SFR<3> and the 6-th subframe SFR<6>.

Figure 3:
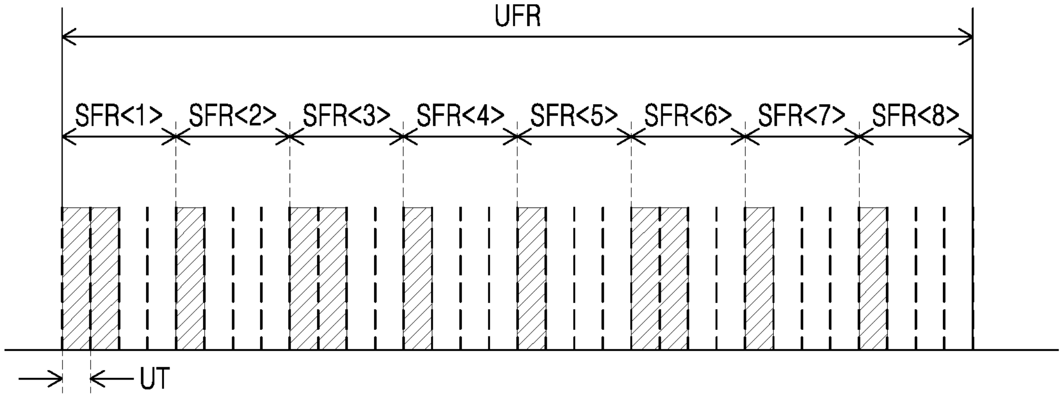

In the case of (Table 2), the activation width of the modulation signal XMOD in each subframe SFR is as shown in FIG. 3.

In other words, in each of the 2-nd subframe SFR<2>, the 4-th subframe SFR<4>, the 5-th subframe SFR<5>, the 7-th subframe SFR<7> and the 7-th subframe SFR<8>, the activation width of the modulation signal XMOD corresponds to the number ‘a’ of unit time UT, for example, the number ‘1’ of unit time UT.

In each of the 1-st subframe SFR<1>, the 3-rd subframe SFR<3> and the 6-th subframe SFR<6>, the activation width of the modulation signal XMOD is corresponded to the number ‘a+1’ of unit time UT, for example, the number ‘2’ of unit time UT.

As a result, in the case of (Table 2), the subframes SFR in which the number of unit time(s) UT is (a+1) in which the modulation signal XMOD is activated, are (a+1) are not continuous.

In this embodiment, it can be seen that the location of the subframe SFR in which the activation width of the modulation signal XMOD is corresponded to the number ‘a’ or the number ‘(a+1)’ of unit time is determined by the ‘position determination number (e)’.

In summary, in the display device of the disclosure, the unit time UT in which the modulation signal XMOD is activated, for example, the active unit time, is determined according to the data value of the display data DDAT of the light emitting element PIX. The active unit time of each subframe SFR may be different from each other. In this case, in the display device of the disclosure, the continuous progress of at least one of the progress of subframes SFRs having a relatively large active unit time and the progress of subframes SFRs having a relatively small active unit time is prevented.

Accordingly, in the display device of the disclosure, subframes having the same number of active unit time(s) are distributed. As a result, according to the display device of the disclosure, the flicker phenomenon is alleviated.

While the disclosure has been described with reference to the embodiments shown in the drawings, these embodiments are merely illustrative and it should be understood that various modifications and other equivalent embodiments can be derived by those skilled in the art on the basis of the embodiments.

It will be apparent to those skilled in the art that various modifications can be made to the above-described embodiments of the disclosure without departing from the spirit or scope of the disclosure. Thus, it is intended that the disclosure covers all such modifications provided they come within the scope of the appended claims and their equivalents.

What is claimed is:

1. A display device comprising:

a display panel including a light emitting element, wherein the light emitting element emits light with brightness according to a total amount of current flowing in the light emitting element during a unit frame;

a data driver that allows current to flow through the light emitting element of the display panel for a time corresponding to an activation width of a modulation signal; and a pulse width modulator that generates the modulation signal with modulating display data of the light emitting element of the display panel during the unit frame, wherein the activation width of the modulation signal corresponds to a data value of the display data, wherein the unit frame includes 1-st to n-th subframes which are sequentially progressed, each of the 1-st to n-th subframes is a number 'p' of unit times, each of the unit times corresponds to a corresponding unit data value of the display data, the activation width of the modulation signal in the i-th subframe is associated with whether an integer value of an estimated cumulative error of the i-th subframe is equal to the integer value of the estimated cumulative error of the (i−1)-th subframe, the estimated cumulative error of the i-th subframe is defined by {(i*r+e)/n}, 'n' is a natural number greater than or equal to '4', 'p' is a natural number greater than or equal to '2', 'i' is a natural number between '1' and'n', 'r' is a remainder obtained by dividing the data value of the display data by 'n', 'r' is an integer between '0' and'(n−1)', and 'e' is an arbitrary number.

2. The display device of claim 1, wherein the integer value of the estimated cumulative error of a 0-th subframe is '0'.

3. The display device of claim 2, wherein the activation width of the modulation signal in the i-th subframe corresponds to a length of a number 'a' of the unit times in case that the integer value of the estimated cumulative error of the i-th subframe is equal to the integer value of the estimated cumulative error of the (i−1)-th subframe, and 'a' is a quotient obtained by dividing the data value of the display data by 'n'.

4. The display device of claim 3, wherein the activation width of the modulation signal in the i-th subframe corresponds to the length of a number 'a+1' of the unit times in case that the integer value of the estimated cumulative error of the i-th subframe is different from the integer value of the estimated cumulative error of the (i−1)-th subframe.

5. The display device of claim 1, wherein 'e' is '0'.

6. The display device of claim 1, wherein 'e' is 'n−1'.

7. The display device of claim 5, wherein the integer values of the 1st and 2nd subframes are '0', the integer values of the 3rd to 5th subframes are '1', the integer values of the 6th to 7th subframes are '2', and the integer value of the 8th subframe is '3'.

8. The display device of claim 1, wherein the pulse width modulator transmits the modulation signal to a switch of the data driver, and the switch of the data driver is activated based on the modulation signal.

9. A pulse width modulator comprising:

a data storing part that stores display data; and a pulse width modulating part that receives the display data provided from the data storing part, and generates a modulation signal with modulating the display data during a unit frame, wherein an activation width of the modulation signal corresponds to a data value of the display data, wherein the unit frame includes 1-st to n-th subframes which are sequentially progressed, each of the 1-st to n-th subframes is a number 'p' of unit times, each of the unit times corresponds to a corresponding unit data value of the display data, the activation width of the modulation signal in the i-th subframe is associated with whether an integer value of an estimated cumulative error of the i-th subframe is equal to the integer value of the estimated cumulative error of the (i−1)-th subframe, the estimated cumulative error of the i-th subframe is defined by {(i*r+e)/n}, 'n' is a natural number greater than or equal to '4', 'p' is a natural number greater than or equal to '2', 'i' is a natural number between '1' and'n', 'r' is a remainder obtained by dividing the data value of the display data by 'n', 'r' is an integer between '0' and'(n−1)', and 'e' is an arbitrary number.

10. The pulse width modulator of claim 9, wherein the integer value of the estimated cumulative error of a 0-th subframe is '0'.

11. The pulse width modulator of claim 10, wherein the activation width of the modulation signal in the i-th subframe corresponds to a length of a number 'a' of the unit times in case that the integer value of the estimated cumulative error of the i-th subframe is equal to the integer value of the estimated cumulative error of the (i−1)-th subframe, and 'a' is a quotient obtained by dividing the data value of the display data by 'n'.

12. The pulse width modulator of claim 11, wherein the activation width of the modulation signal in the i-th subframe corresponds to the length of 'a+1' number of the unit times in case that the integer value of the estimated cumulative error of the i-th subframe is different from the integer value of the estimated cumulative error of the (i−1)-th subframe.

13. The pulse width modulator of claim 9, wherein 'e' is '0'.

14. The pulse width modulator of claim 9, wherein 'e' is 'n−1'.

15. The pulse width modulator of claim 13, wherein
the integer values of the 1st and 2nd subframes are '0',
the integer values of the 3rd to 5th subframes are '1',
the integer values of the 6th to 7th subframes are '2', and
the integer value of the 8th subframe is '3'.

* * * * *